May 23, 1961 C. E. BELLINGER 2,985,565
FRACTIONATING TOWER CONTROL SYSTEM
Filed July 17, 1958
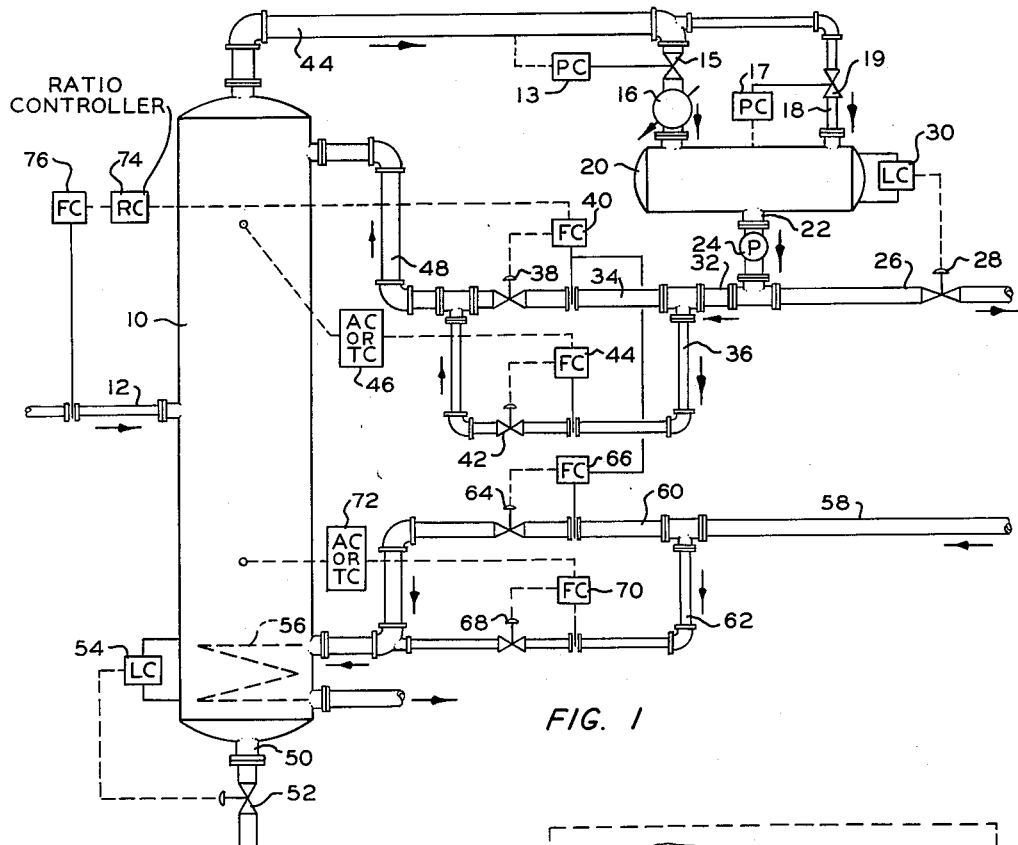
FIG. 1
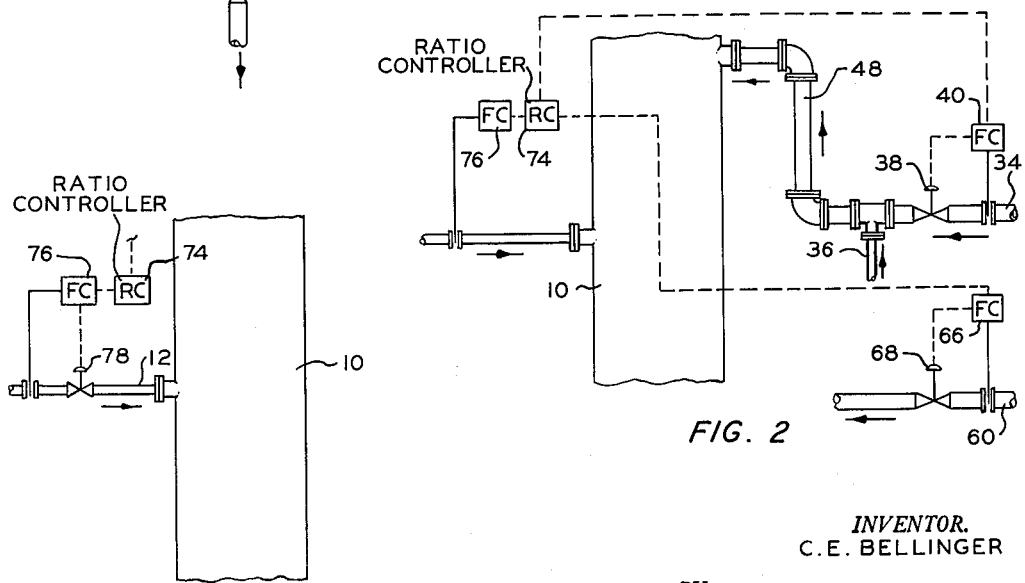
FIG. 2
FIG. 3
INVENTOR.
C. E. BELLINGER
BY Hudson & Young
ATTORNEYS

United States Patent Office 2,985,565
Patented May 23, 1961

2,985,565
FRACTIONATING TOWER CONTROL SYSTEM
Carnot E. Bellinger, Sweeny, Tex., assignor to Phillips Petroleum Company, a corporation of Delaware
Filed July 17, 1958, Ser. No. 749,104
10 Claims. (Cl. 202—160)

This invention relates to improved fractionating tower control systems.

In the design of a fractionation system, an attempt is usually made to establish the heat balance by means of the reflux-to-feed and steam-to-feed ratios. However, it is extremely difficult to maintain the desired control in actual operation because of the size of the control valves. These valves must be sufficiently large to pass the maximum flow anticipated, so that the valves obviously are oversized for the purpose of making fine adjustments in flow rates. Furthermore, lack of precision due to non-linearity of valve openings can result in errors in flow settings of several per cent. This, of course, has an adverse effect on the quality of the products produced and the economy of operation.

The present invention provides a system whereby smaller valves are employed in order to achieve more accurate adjustments which involve only a small percent of the total reflux or steam rates. This is accomplished by providing in parallel with a main flow conduit a by-pass or trim conduit of smaller diameter. These trim conduits have flow control devices therein which can be reset in response to the measurement of a column or other operating variable. By providing the smaller parallel flow circuit it is possible to employ valves sized to the precision of control desired, rather than valves that are sized by compromising the dual considerations of total flow and desired accuracy or precision. This invention also provides a system to control the reflux and steam rates in response to a measurement of the feed rate to maintain desired ratios between these rates.

Accordingly, it is an object of this invention to provide an improved fractionating column control system.

Another object is to provide a fractionation control system which can accommodate changes in feed quantity and/or in feed composition.

A further object is to achieve these ends by providing control systems having parallel, trim flow circuits provided for reflux and heating medium flows.

Other objects, advantages and features of this invention will become apparent from the following detailed description which is taken in conjunction with the accompanying drawings in which:

Figure 1 is a schematic representation of a first embodiment of the control system of this invention;

Figure 2 represents a modification of the bulk control loop which can be employed in conjunction with the apparatus of Figure 1; and Figure 3 shows a modification applicable to either Figure 1 or Figure 2.

Referring now to Figure 1, a fractionating column 10 has a feed conduit 12 connected intermediate the ends thereof. From the upper portion of the column an overhead product conduit 44 removes gaseous products through a condenser 16 and a condenser by-pass conduit 18 to an accumulator 20. A pressure controller 13 which is responsive to the pressure in conduit 44 or the top of column 10 regulates a valve 15 in the conduit through condenser 16. A pressure controller 17 which is responsive to the pressure in accumulator 20 regulates a valve 19 in conduit 18. These two pressure controllers regulate the relative flows to maintain desired pressures in column 10 and accumulator 20. Liquid product leaves the accumulator through a conduit 22, is pumped to an appropriate pressure by a pump 24, and such product as is withdrawn from the system leaves through a conduit 26. A valve 28, responsive to a liquid level controller 30 on accumulator 20, adjusts the flow through the conduit 26. A conduit 32 connects to the reflux supply system which comprises a main reflux conduit 34 and a trim reflux conduit 36 connected in parallel relationship. The main reflux flow is controlled by a valve 38 which is responsive to a flow controller 40. The trim reflux flow is controlled by a valve 42 and a flow controller 44 which is reset by an analyzer or temperature recorder-controller 46. The total reflux is delivered by a conduit 48 to a tray in the upper region of column 10.

A bottoms product conduit 50 permits withdrawal of liquid from the lower region of the column. The flow through conduit 50 is regulated by a valve 52 responsive to a liquid level controller 54 on the bottom of column 10. A reboiler 56, or other means of applying heat to the materials in the column, receives a heating medium from a conduit 58. The flow from conduit 58 is split into two parallel paths, namely through conduits 60 and 62. Conduit 60 carries the main portion of the heating medium and the flow therethrough is regulated by a valve 64 responsive to a flow controller 66. Similarly, the flow through the trim conduit 62 is regulated by valve 68 responsive to a flow controller 70. Flow controller 70 is reset by an analyzer or temperature controller 72.

A ratio controller 74 regulates the ratio of reflux to feed by resetting controller 40 which in turn resets controller 66. A flow controller 76 supplies an input signal to ratio controller 74 which is representative of the feed flow through conduit 12. The several flow controllers can be conventional instruments known in the art and available commercially, such as, for example, the controller described in Bulletin 5A–10A of the Foxboro Company, Foxboro, Massachusetts. The ratio controller can be a Foxboro M40 controller, such as described on page 16, Figure A869, of this bulletin. Similarly, the temperature controllers 46 and 72 can be Foxboro M40 single action controllers as shown on page 11, Figure A862 of this bulletin. If analyzer-controllers are employed as elements 46 and 72, the analyzers can be differential refractometers, infra red analyzers, ultra violet analyzers, chromatographic analyzers, or other analytical instruments known in the art. The particular analyzer selected should be able to detect a constituent or group of constituents present in the fluid mixture in the column or provide a signal representative of the composition of the fluid mixture in the column. These analyzers are described in greater detail hereinafter.

Excellent control is provided when the sizes of the main reflux conduit 34 and the trim conduit 36 are such that the latter can carry approximately 10 percent of the total flow at normal design conditions, for example. Similarly, the trim conduit 62 and main conduit 60 are sized so that the former can carry approximately 10 percent of the total flow, i.e. the flow through conduit 58, for example.

As a specific example of the operation of this invention, reference is made to a fluid separation as follows:

| Constituent | Flow Rate (Barrels/Hour) | | | | | (Pounds/Hour) | |
|---|---|---|---|---|---|---|---|
| | 12 | 26 | 50 | 34 | 36 | 60 | 62 |
| Normal butane | 0.1 | 0.1 | | | | | |
| Isopentane | 22.7 | 22.7 | | | | | |
| Normal pentane | 26.0 | 26.0 | Trace | | | | |
| Cyclopentane | 2.0 | Trace | 2.0 | | | | |
| Hexane and heavier | 49.2 | | 49.2 | | | | |
| Total | 100.0 | 48.8 | 51.2 | 360 | 40 | | |
| Steam (165 p.s.i.) | | | | | | 16,200 | 1,800 |

Column 10 has 40 trays. The feed enters at tray No. 20, controller 72 measures at tray No. 10, and controller 46 measures at tray No. 35. The feed enters column 10 at 170° F. and at a pressure of 70 p.s.i.a. The top of column 10 is at a temperature of 186° F. and a pressure of 65 p.s.i.a., and the bottom of column 10 is at a temperature of 324° F. and a pressure of 75 p.s.i.a. Accumulator 20 is at a temperature of 171° F. and a pressure of 55 p.s.i.a.

If the feed rate should increase by 20 percent to 120 barrels per hour, for example, the total reflux should increase to 480 barrels per hour to maintain the reflux ratio of 4 to 1. Ratio controller 74 tends to open valve 38 by 20 percent to increase the flow through conduit 34 to 432 barrels per hour. However, in actual practice, valve 38 may pass more or less than this desired amount. For example, it will be assumed that valve 38 permits as much as 464 barrels per hour to flow through conduit 34. For a short time, 40 barrels per hour continues to flow through conduit 36 so that the total reflux is 504 barrels per hour, which is in excess of the desired flow by 24 barrels per hour.

Controller 46 soon detects this excess either by analyzing the mixture in the column or by measuring the temperature. Controller 46 detects either a rise in the overhead product concentration or a decrease in temperature and resets controller 44 to pinch down on valve 42 to reduce the flow through conduit 36 to 16 barrels per hour. When this sequence of events has taken place, the reflux rate is at the desired value for the increased feed rate. If the feed rate decreases, the reverse action takes place. In the example described, valve 38 may not open enough when controller 40 is reset by ratio controller 74. If this should occur, controller 46 opens valve 42 an additional amount. A similar sequence of events takes place with relation to the steam flow through conduits 60 and 62. When the feed rate to column 10 increases, ratio controller 74 operates to open valve 64 more by resetting controller 66 through controller 40.

In the described example, the total steam input should increase to 21,600 pounds per hour. Valve 64 should be opened to increase the flow through conduit 60 to 19,440 pounds per hour. However, it will be assumed that this control is in error so that 20,200 pounds per hour of steam are supplied. Controller 72 soon senses a rise in temperature or a decrease in concentration of the light fractions of the fluid mixture. This tends to close valve 68 to reduce the flow through conduit 62 to 1,400 pounds per hour.

As a second example, it is assumed that the feed composition changes so that the separation is as follows:

| Constitutent | Flow Rate (Barrels/Hour) | | |
|---|---|---|---|
| | 12 | 26 | 50 |
| Normal butane | 0.1 | 0.1 | |
| Isopentane | 30.0 | 30.0 | |
| Normal pentane | 34.4 | 34.4 | Trace |
| Cyclopentane | 2.8 | Trace | 2.8 |
| Hexane and heavier | 32.7 | | 32.7 |
| Total | 100.0 | 64.5 | 35.5 |

The feed rate is again 100 barrels per hour, but the amount of light constituents is increased. This causes a demand for more heat because it is necessary to supply more steam to make up for the increased demand for latent heat. Of course, this demand is offset slightly by the decrease in sensible heat that results from the decreased amount of bottoms product appearing in the feed. In this case a decreased temperature is sensed by both of the temperature controllers 46 and 72, for example. This event causes controller 70 to be reset to increase the amount of steam supplied. The controller 46 detects a fall in temperature at the upper region of the column to decrease the amount of reflux going through the trim conduit 46. This has the effect of reducing the heat requirement because of a decrease in the amount of cold liquid entering the column as reflux. If the feed becomes heavier, the control action is reversed.

In this second example, the feed is supplied at 170° F. and at a pressure of 70 p.s.i.a. Accumulator 20 is at a temperature of 171° F. and a pressure of 55 p.s.i.a. The top of column 10 is at a temperature of 186° F. and a pressure of 65 p.s.i.a., and the bottom of column 10 is at a temperature of 315° F. and a pressure of 75 p.s.i.a. The flow of reflux through conduit 34 remains at 360 barrels per hour, but the flow of reflux through conduit 36 is decreased to 39 barrels per hour. The flow of steam through conduit 60 remains at 16,200 pounds per hour, but the flow of steam through conduit 62 is increased at 1900 pounds per hour.

As shown in the drawing and explained in the foregoing examples, the portion of the control system that includes ratio controller 74, flow controller 40 and flow controller 66 comprises a bulk control loop. This means that the major portion of the fluid streams involved are controlled by this particular loop. An important feature of this invention resides in the control loops of controllers 46 and 44 for the reflux and controllers 72 and 70 for the heat supply. Inasmuch as the valves 42 and 68 of the latter are sized to control only a fraction of the total flows, these valves can be selected to provide accuracy and closeness of control rather than to compromise accuracy with the quantity which must be handled.

As a specific example, these valves can all be double port throttle plug valves sized as follows:

| Valve | Size, inches | Pressure Drop, p.s.i. | Valve Opening | | Maximum Flow |
|---|---|---|---|---|---|
| | | | Flow | Percent Open | |
| 38 | 5 | 10 | 400 b./h | 45 | 1,200 b./h. |
| 42 | 1½ | 10 | 40 b./h | 42 | 110 b./h. |
| 64 | 6 | 10 | 18,000 #/h | 65 | 32,600 #/h. |
| 68 | 4 | 10 | 900 #/h | 49 | 5,200 #/h. |

In the modification of Figure 2, there is no lag in the adjustment of the main steam valve 68 because the control signal is received directly from the ratio controller 74. The advantage of this system is that heat supply is increased concurrently with an increase in reflux. This keeps the major portion of the control load on the bulk loop and retains the temperature and/or the tray analyses at a relatively constant level, but permits precision control to be accomplished by the respective trim loops. Actually, two flow controllers 74 may be required to regulate the two controllers 40 and 66 because of the different ratios of reflux and steam to feed.

In Figure 3, controller 76 regulates a valve 78 in conduit 12 to maintain a constant feed rate. The flows through conduits 34 and 60 thus remain constant. The chief purpose of ratio controller 74 is to permit the set points of controllers 40 and 66 to be adjusted in unison, if desired.

The points at which controllers 46 and 72 measure their respective temperatures or analyses are determined by considering the expected swings in feed quantity and composition, speed of response, column size, and the flexibility of system, i.e. its ability to be adjusted for producing a variety of products. Thus, temperature controllers should be connected to regions where temperature normally changes relatively fast with respect to adjacent trays. Composition analyzers should be selected which are capable of performing accurate, rapid analyses on the mixture in the column. In general, analyzer 46 should measure one of the constituents in the bottoms stream, and analyzer 72 should measure one of the constituents in the overhead stream. Analyzers such as differential refractometers, of course, measure a property representative of the composition of the fluid mixtures.

One special advantage of this control system is that it can be installed on existing equipment. No changes in heat exchangers or other system elements are necessary. In the preferred embodiment, the by-pass lines and valves are sized to carry approximately 10 percent of the flow in order to achieve a workable maximum of accuracy in control. Of course, different sizing may be necessary for a particular installation.

It should be apparent from the foregoing disclosure and examples that many modifications and extensions of the instant invention can be employed to increase accuracy or to increase the range of accuracy. For example, the feed regulating valve 78 (Figure 3) and its controller 76 can be automatically reset by providing another analyzer or temperature controller to detect conditions at or near the feed tray. Alternatively, valve 78 can be eliminated (Figures 1 and 2). The feed control valve of Figure 3 is suitable for installations where only negligible swings in feed quantity (flow rate) can be tolerated, e.g. where a column upstream or downstream has a limited capacity. Of course, control responsive to composition changes is still achieved with such an arrangement. Also, a plurality of trim loops can be provided for extending the range of control to extremely low or extremely high flows. Although the positions of the respective controllers 46 and 72 have been stated by way of example, it is to be understood that measurements can be taken at other suitable places in the column according to the speed of response or the amount of lag desired.

Thus, it is not intended that the invention be limited to specific embodiments as set forth in the accompanying drawings, specification and claims.

What is claimed is:

1. Fluid separation apparatus comprising a fractionation column having a reboiler; an accumulator; first conduit means communicating between the top of said column and said accumulator; second conduit means communicating with said column at a region intermediate the ends thereof to introduce a fluid feed mixture; third and fourth conduit means connected in parallel between said accumulator and an upper region of said column to return fluid to said column as reflux; fifth and sixth conduit means communicating with said reboiler to introduce a heating medium, said fourth conduit means being of smaller cross-sectional area than said third conduit means and said sixth conduit means being of smaller cross-sectional area than said fifth conduit means; first, second, third and fourth valves in said third, fourth, fifth and sixth conduit means, respectively; means responsive to the rate of flow through said second conduit means to adjust said first valve; means responsive to the rate of flow through said second conduit means to adjust said third valve; means responsive to the composition of the fluid mixture in the upper region of said column to adjust said second valve; and means responsive to the composition of the fluid mixture in the lower region of said column to adjust said fourth valve.

2. The apparatus of claim 1 wherein at least one of said means responsive to the composition of the fluid mixture in said column includes means to establish a control signal representative of a temperature in said column.

3. The apparatus of claim 1 wherein at least one of said means responsive to the composition of the fluid mixture in said column includes an analyzer, and conduit means communicating between said column and said analyzer to pass a sample stream thereto.

4. The apparatus of claim 1 further comprising first, second, third and fourth flow controllers responsive to rates of flow through said third, fourth, fifth and sixth conduit means, respectively, to adjust said first, second, third and fourth valves, respectively; and wherein said means to adjust said valves comprise means to reset respective ones of said flow controllers.

5. The apparatus of claim 1 wherein said means to adjust said first and third valves comprise ratio control means responsive to the rate of flow through said second conduit means to maintain preselected ratios between the flows through said third and second conduit means and through said fifth and second conduit means.

6. The apparatus of claim 1 further comprising a fifth valve in said first conduit means, and means responsive to the rate of flow through said second conduit means to adjust said fifth valve.

7. Fluid separation apparatus comprising a fractionation column having a reboiler; an accumulator; first conduit means communicating between the top of said column and said accumulator; second conduit means communicating with said column at a region intermediate the ends thereof to introduce a fluid feed mixture; third conduit means connected between said accumulator and an upper region of said column to return fluid to said column as reflux; fourth conduit means communicating with said reboiler to introduce a heating medium; means responsive to the rate of flow through said second conduit means to adjust the rate of flow through said third conduit means to maintain a predetermined ratio therebetween; means responsive to the rate of flow through said second conduit means to adjust the rate of flow through said fourth conduit means to maintain a predetermined ratio therebetween; means responsive to the composition of the fluid mixture in the upper region of said column to adjust further the flow through said third conduit means; and means responsive to the composition of the fluid mixture in the lower region of said column to adjust further the flow through said fourth conduit means.

8. In a fluid separation system including a fractionation column having a reboiler, an accumulator, first conduit means communicating with a region of said column intermediate the ends thereof to introduce a fluid mixture to be separated, second conduit means communicating between the top of said column and said accumulator, third conduit means communicating with said accumulator to remove an overhead product, fourth conduit means communicating between said accumulator and an upper region of said column to return fluid to said column as reflux, fifth conduit means communicating with said reboiler to introduce a heating medium, and sixth conduit means communicating with the bottom of said column to remove a kettle product; a control system comprising means responsive to the rate of flow through said first conduit means to adjust the flow through said fourth conduit means, means responsive to the rate of flow through said first conduit means to adjust the flow through said fifth conduit means, seventh conduit means connected in parallel with said fourth conduit means, said seventh conduit means being of smaller cross-sectional area than said fourth conduit means, means responsive to the composition of the fluid mixture in the upper region of said column to adjust the flow through said seventh conduit means, eighth conduit means connected in parallel with said fifth conduit means, said eighth conduit means being of smaller cross-sectional area than said fifth conduit means, and means responsive to the composition of the fluid mixture in the lower region of said column to adjust the flow through said eighth conduit means.

9. In a fluid separation system including a fractionation column having a reboiler, an accumulator, first conduit means communicating with a region of said column intermediate the ends thereof to introduce a fluid mixture to be separated, second conduit means communicating between the top of said column and said accumulator, third conduit means communicating with said accumulator to remove an overhead product, fourth conduit means communicating between said accumulator and an upper region of said column to return fluid to said column as reflux, fifth conduit means communicating with said reboiler to introduce a heating medium, and sixth conduit means communicating with the bottom of said column to remove a kettle product; a control system comprising means responsive to the rate of flow through said first conduit means to adjust the flow through said fourth conduit means, seventh conduit means connected in parallel with said fourth conduit means, said seventh conduit means being of smaller cross-sectional area than said fourth conduit means, and means responsive to the composition of the fluid mixture in the upper region of said column to adjust the flow through said seventh conduit means.

10. In a fluid separation system including a fractionation column having a reboiler, an accumulator, first conduit means communicating with a region of said column intermediate the ends thereof to introduce a fluid mixture to be separated, second conduit means communicating between the top of said column and said accumulator, third conduit means communicating with said accumulator to remove an overhead product, fourth conduit means communicating between said accumulator and an upper region of said column to return fluid to said column as reflux, fifth conduit means communicating with said reboiler to introduce a heating medium, and sixth conduit means communicating with the bottom of said column to remove a kettle product; a control system comprising means responsive to the rate of flow through said first conduit means to adjust the flow through said fourth conduit means, seventh conduit means connected in parallel with said fifth conduit means, said seventh conduit means being of smaller cross-sectional area than said fifth conduit means, and means responsive to the composition of the fluid mixture in the lower region of said column to adjust the flow through said seventh conduit means.

References Cited in the file of this patent

UNITED STATES PATENTS

| | | |
|---|---|---|
| 2,627,280 | Adelson | Feb. 3, 1953 |
| 2,692,800 | Nichols et al. | Oct. 26, 1954 |
| 2,709,678 | Berger | May 31, 1955 |
| 2,813,594 | Gantt | Nov. 19, 1957 |

OTHER REFERENCES

"Instruments and Process Control," published by N.Y. State Vocational and Practical Arts Association, 1945.